United States Patent
Salehi et al.

(10) Patent No.: US 8,505,577 B2
(45) Date of Patent: Aug. 13, 2013

(54) PNUMATICALLY ACTUATED BI-PROPELLANT VALVE (PABV) SYSTEM FOR A THROTTLING VORTEX ENGINE

(75) Inventors: Daryoush M. Salehi, Huntsville, AL (US); Roger P. Berry, Huntsville, AL (US); Nathan P. Mathis, Fayetteville, TN (US); Robert S. Michaels, Scottsboro, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 408 days.

(21) Appl. No.: 12/927,951

(22) Filed: Nov. 30, 2010

(65) Prior Publication Data
US 2012/0132297 A1 May 31, 2012

(51) Int. Cl.
*F02K 9/52* (2006.01)

(52) U.S. Cl.
USPC ........... 137/607; 137/809; 137/810; 137/813; 60/258

(58) Field of Classification Search
USPC .................. 137/605–607, 808–813; 60/257, 60/258
See application file for complete search history.

(56) References Cited

U.S. PATENT DOCUMENTS

| | | | | |
|---|---|---|---|---|
| 2,896,406 | A | * | 7/1959 | Zletz et al. ........................ 60/214 |
| 3,302,406 | A | * | 2/1967 | Braue, Jr. ......................... 60/257 |
| 3,570,249 | A | * | 3/1971 | Baum et al. ...................... 60/259 |
| 3,782,116 | A | * | 1/1974 | Burge et al. ...................... 60/258 |
| 6,381,949 | B1 | * | 5/2002 | Kreiner et al. ................... 60/258 |
| 6,408,879 | B1 | * | 6/2002 | Ohmi et al. .................... 137/606 |
| 7,257,939 | B2 | * | 8/2007 | Michaels et al. ................ 60/258 |

* cited by examiner

*Primary Examiner* — Craig Schneider
(74) *Attorney, Agent, or Firm* — Michael K. Gray

(57) ABSTRACT

Regulated pneumatic gas is supplied through a gas supply tube (14) which is welded to a pilot valve housing (18) which accommodates a solenoid valve (16). When the solenoid valve is electrically activated and opened, the pneumatic gas flows through a bifurcated channel (22) which is welded to the pilot valve housing and to a fuel valve mechanism (24A) and to an oxidizer valve mechanism (24B). The force of the pneumatic gas causes pistons (38A, 38B) to actuate respective poppets (36A, 36B). Movement of the poppets results in the dispensing of fuel propellant from a fuel outlet chamber (44A) and the dispensing of oxidizer from an oxidizer outlet chamber (44B). The fuel valve mechanism and oxidizer valve mechanism are positioned and oriented such that the exiting fuel and oxidizer are mixed in a vortex rocket engine.

20 Claims, 5 Drawing Sheets

US 8,505,577 B2

PNUMATICALLY ACTUATED BI-PROPELLANT VALVE (PABV) SYSTEM FOR A THROTTLING VORTEX ENGINE

DEDICATORY CLAUSE

The invention described herein may be manufactured, used and licensed by or for the U.S. Government without payment of any royalties thereon.

BACKGROUND OF THE INVENTION

I. Field of the Invention

The present invention pertains generally to pneumatic valves. More particularly the present invention pertains to a valve system for mixing a fuel propellant and oxidizer in the injector housing of a rocket engine.

II. Discussion of the Background

In conventional engines, mass flow control is typically accomplished in one of three ways. The first approach utilizes throttling valves that are positioned upstream of the propellant supply manifold. Although this approach is the simplest to implement, high throttling ratios (maximum mass flow rate divided by minimum mass flow rate) cannot be achieved without a significant loss in engine performance. The losses occur because the minimum allowed pressure drop across the injection orifices is not maintained at the entrance to the orifice. The only way to overcome this loss is with a configuration that closely couples the throttling mechanism to the injection orifice.

The second approach is to close couple the throttling mechanism to the injection orifice. With this approach, the propellant manifold is breached and either an electrical or pneumatic actuator is used to drive the mechanism via a mechanical link that passes through this breach. The drawback to this approach is that the breach requires a complex sealing system at the manifold-to-mechanical link interface, which gives rise to reliability issues.

The third approach is a throttling technique known as SLAMMITT (Sliding Action Magneto Mechanical Injector Throttling Technique) which is taught in U.S. Pat. No. 7,257,939 which is herein incorporated by reference. This technique achieves close coupling of the throttling mechanism to the injector orifices. No breach in the propellant manifolds is required since an electric motor is used to drive the throttling assembly. A drawback to this approach concerns the sealing and assembly of the hardware. The assembly is tedious and once assembled the integrity of the seals and throttling hardware cannot be verified.

All of the above prior art techniques concern systems where the fuel manifold is coupled to the combustion chamber. This poses a problem when the engine is fired for extended periods of time, or pulsed on and off multiple times. These actions can cause heat buildup in the combustion chamber walls. If the manifolds share a common wall with the combustion chamber, the unburned, yet reactive, propellants can absorb heat from the combustion chamber and react in the manifolds, causing catastrophic destruction of the engine.

SUMMARY OF THE INVENTION

The Pneumatically Actuated, Bi-propellant Valve (PABV) of the present invention is a pneumatically actuated mechanical valve system that provides simultaneous on-demand mass flow control of fuel and oxidizer into the combustion chamber of a vortex engine. The PABV system is designed to be mounted radially outside the injector housing walls between the fuel and oxidizer holding tanks and the injector housing orifices. The valve contains two piston/poppet assemblies that when pressurized, open the flow of both the fuel and oxidizer to the injector housing.

PABV is intended to enhance the flexibility of vortex engines by allowing efficient throttling of the engine while helping to mitigate propellant ignition delay. As has been mentioned, excess heat build-up in the manifolds can jeopardize the integrity of unburned propellant. The present invention is designed to decouple the propellant fuel manifold from the combustion chamber so as to reduce the potential for excess heat moving from the combustion chamber to the unburned propellant in the manifolds. PABV requires fewer elastomeric seals and is much easier to assembly than the SLAMMITT hardware, while retaining SLAMMITT's high efficiency throttling.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION

Figure 1:
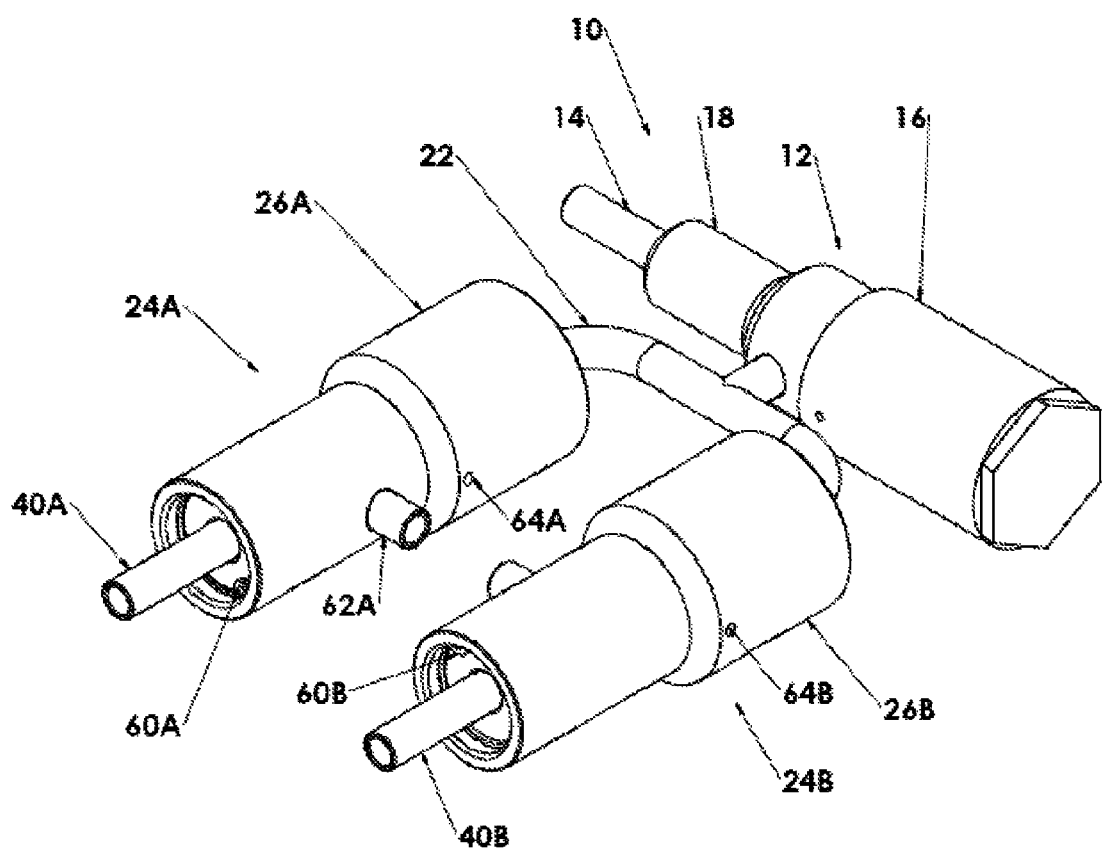
FIG. 1 is perspective illustration of the PABV system of the present invention.
Figure 2:
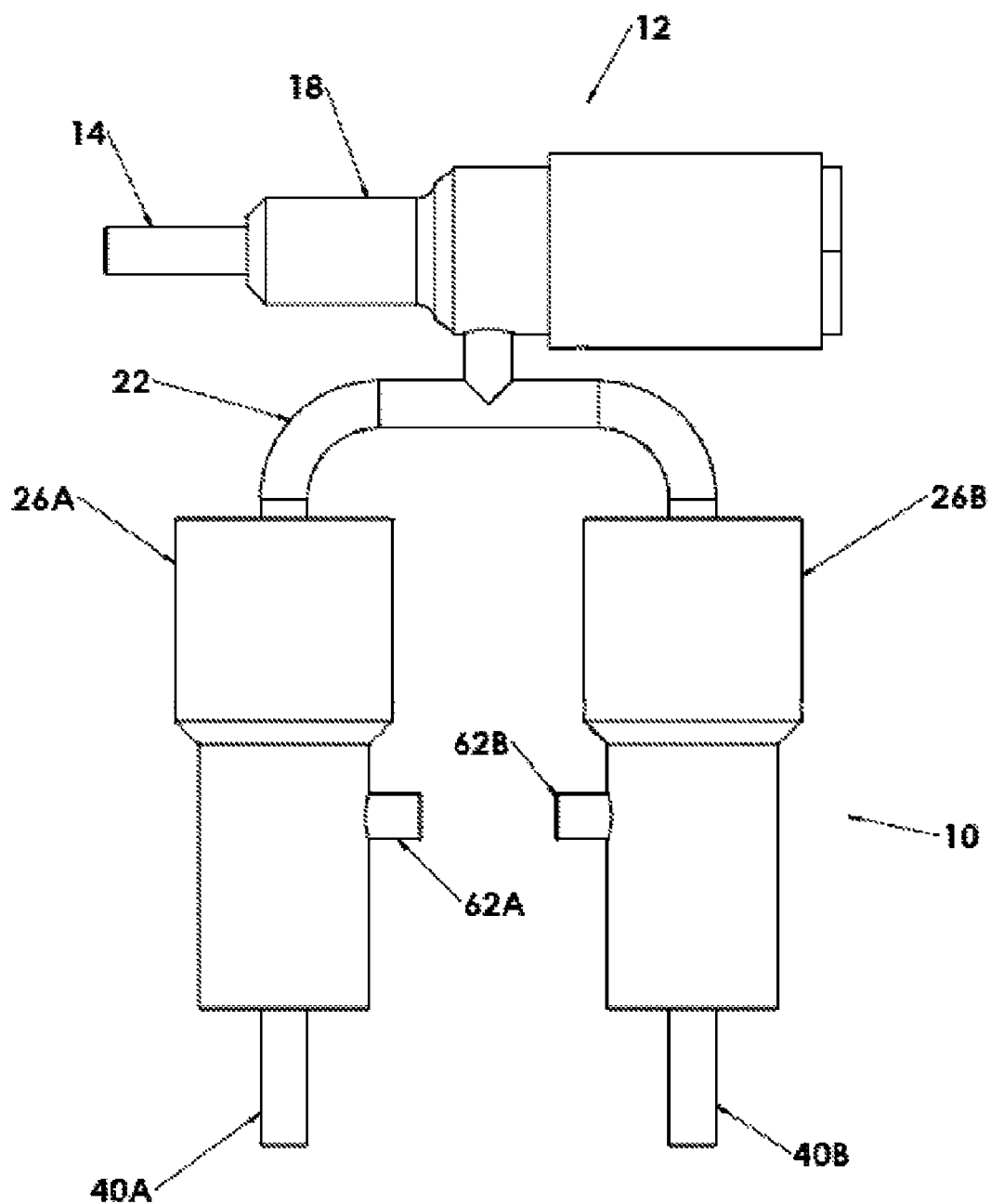
FIG. 2 is a top view of the PABV system of the present invention.

With reference to FIG. 1 and FIG. 2, the pneumatically actuated bi-propellant valve (PABV) system 10 of the present invention has a pilot valve assembly 12, a first valve mechanism 24A and a second valve mechanism 24B. The first valve mechanism is activated by the pilot valve assembly 12 to dispense fuel to the injector valve housing (not shown) of a throttling vortex engine system.

When the pilot valve assembly 12 activates the first valve mechanism 24A to dispense fuel, it also activates the second valve mechanism 24B to dispense oxidizer so that oxidizer and fuel are both dispensed to the injector valve housing of a rocket engine at the same time. When de-energized, the pilot valve assembly 12 diverts the trapped high pressure control gas to atmosphere through venting ports (not shown) in the pilot valve 16 which results in valve mechanisms 24A, 24B both returning to a closed state.

Figure 3:
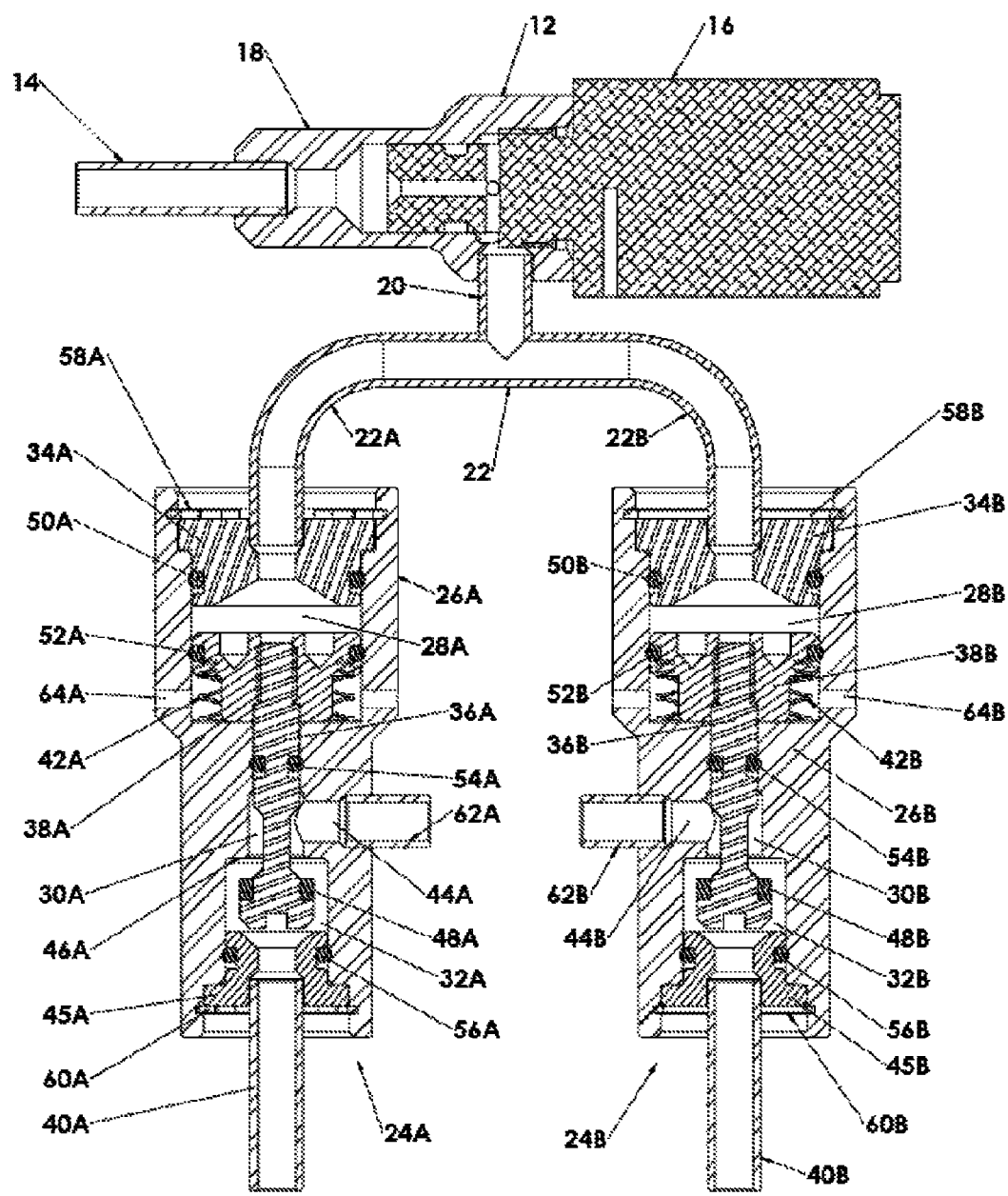
FIG. 3 is cross-sectional, X-ray view of the PABV system of the present invention.

With reference to FIG. 3, in the pneumatically actuated bi-propellant valve system 10 of the present invention, the pilot valve assembly 12 includes a gas supply tube 14 directly connecting to a pilot valve 16 secured to a pilot valve housing 18. The pilot valve in the prototype of the present invention is a solenoid pilot valve as those in the art would appreciate. The electrically activated solenoid pilot valve 16 is used to direct the high pressure control gas on command. When energized the solenoid pilot valve 16 allows the high pressure gas to flow into the first and second valve mechanisms 24A, 24B, respectively. (Other equivalent-type valves could be utilized without deviating from the teachings of the present invention.) In operation, an electrical signal is sent to the pilot solenoid valve 16 which sets pilot solenoid valve 16 to an open condition.

A pneumatic gas conduit 20 connects to the supply tube 14 and the pilot valve 16. The pneumatic gas conduit 20 further connects to a bifurcated channel 22 (i.e., a fuel manifold). The pneumatic gas used in the prototype of the present invention was pressurized nitrogen.

The first valve mechanism (i.e. a fuel valve) 24A is provided with a housing, i.e., first housing 26A, which forms a first aft chamber region 28A. The fuel valve 24A is further provided with a channel region, i.e., a first channel region 30A and a front chamber region, i.e., first front chamber region 32A, with the housing 26A being molded to form and accommodate the respective interior regions. The bifurcated channel 22 includes a first path 22A which is connected to said first fitting 34A and to said first aft chamber region 28A. A fuel inlet fitting 45A is attached to the first housing 26A and is positioned within the first front chamber region 32A, with the inlet fuel tube 40A being attached to the fuel inlet fitting 45A.

The first aft chamber region 28A is provided with a fitting, i.e, a first fitting 34A, which connects to the bifurcated channel 22. The first channel region 30A accommodates a first poppet 36A. A piston, i.e., a first piston 38A, is located in the first aft chamber region 28A and makes direct contact with the first poppet 36A. An inlet fuel tube 40A is directly connected to the first front chamber region 32A.

A biasing mechanism, i.e., a first biasing mechanism 42A connects to piston 38A and to housing 26A so as to impede movement of piston 38A toward the direction of the inlet fuel tube 40A. The biasing mechanism 42A in the prototype of the present invention was a helical spring, but other equivalent biasing elements could be used.

When pressurized gas coming through the bifurcated channel exerts sufficient force on piston 38A, piston 38A moves the popper 36A a sufficient distance in the direction of the inlet fuel tube 40A such that fuel from the inlet fuel tube can travel to the first front chamber region and continue into the first channel region 30A and into the fuel outlet chamber 44A and out the first outlet tube 62A.

The invention further includes a second valve mechanism 24B identical in construction to the first valve mechanism 24A.

The second valve mechanism 24B is provided with a housing, i.e., second housing 26B which forms an aft chamber region, i.e., second aft chamber region 28B, a channel region, i.e., second channel region 30B and a second front chamber region 32B. The second aft chamber region 28B is provided with a fitting, i.e., second fitting 34B which connects to the bifurcated channel 22. The bifurcated channel 22 includes a second path 22B which is connected to the second fitting 34B and to the second aft chamber region 28B. The second channel region 30B accommodates a poppet, i.e., second poppet 36B, with a piston, i.e., second piston 38B located in the second aft chamber region 28B making direct contact with the second poppet 36B.

The second valve mechanism 24B further includes an inlet oxidizer tube 40B which is directly connected to a front chamber region, i.e., second front chamber region 32B. A spring, i.e., second biasing mechanism 42B, which connects to piston 38B and to housing 26B, impedes movement of the second piston 38B in the direction of said inlet oxidizer tube 40B. An oxidizer inlet fitting 45B is attached to the second housing 26B and is positioned within the second front chamber region 32B, with the inlet oxidizer tube 40B being attached to the oxidizer inlet fitting 45A.

When pressurized gas coming through the bifurcated channel 22 exerts sufficient force on piston 38B, the second piston 38B moves the poppet 36B a sufficient distance in the direction of the inlet oxidizer tube 40B such that oxidizer from the inlet oxidizer tube can travel to the second front chamber region 32B and continue into the second channel region 30B into the oxidizer outlet chamber 44B and out the second outlet tube 62B.

First valve mechanism 24A and first valve mechanism 24B are oriented in such a way that when fuel exits the first outlet tube 62A and oxidizer exits the oxidizer second outlet tube 62B, the fuel and oxidizer are instantaneously mixed.

In operation of the system of the present invention, when said pilot valve 16 is open, pressurized gas flows from the supply tube 14 through conduit 20 and into the bifurcated channel 22 such that the pressurized gas exerts a sufficient force such that said first piston 38A pushes the first poppet 36A in the direction of the inlet fuel tube 40A so as to allow fuel from the inlet fuel tube to pass through the first front chamber region 32A into the first channel region 30A and into the fuel outlet chamber 44A and out first outlet tube 62A.

Likewise, when said pilot valve 16 is open, the pressurized gas flows from said supply tube 14 through conduit 20 and into said bifurcated channel 22 with the pressurized gas exerting a sufficient force such that the second piston 38B pushes the second poppet 36B in the direction toward the inlet oxidizer tube 40B so as to allow oxidizer from the oxidizer inlet tube 40B to pass through the second front chamber region 32B into the second channel region 30B and into the oxidizer outlet chamber 44B.

The PABV system of the present invention is provided with a number of o-rings which act as seals to maintain desired pressures. A first fitting o-ring 50A contacts the first fitting 34A and the first housing 26A. A second fitting o-ring 50B contacts the second fitting 34B and the second housing 26B. A first piston o-ring 52A contacts the first piston 38A and the first housing 26A, and a second piston o-ring 52B contacts the second piston 38B and the second housing 26B. A first poppet o-ring 54A contacts the first poppet 36A and the first housing 26A and a second poppet o-ring 54B contacts the second poppet 36B and the second housing 26B.

With further attention to FIG. 3, a first boundary wall 46A is formed by the first housing 26A. The first boundary wall 46A is positioned at an interface between the first channel region 30A and the first front chamber region 32A. When the pilot valve 16 is closed after being open, the first poppet 36A moves in the direction toward said first fitting 34A and prevents fuel flow from said first front chamber region 32A to said first channel region 30A. The first poppet will stay at rest in contact with the boundary wall 46A until such time as the pilot valve 16 is opened again.

Likewise, a second boundary wall 46B is formed by the second housing 26B, with the second boundary wall being positioned at an interface of the second channel region 30B and the second front chamber region 32B. When the pilot valve 16 is closed after being open, the second poppet 36B moves in the direction toward said second fitting 34B and prevents oxidizer flow from the second front chamber region 32B to the second channel region 30B. Performing the same function as the first poppet 36A, the second poppet 36B will stay at rest and in contact with the second boundary wall 46B until such time as the pilot valve 16 is opened again.

The first poppet 36A and the second poppet 36B are provided with polymer poppet seats 48A, 48B, respectively, for making sealed contact with the respective boundary walls 46A and 46B.

Ventilation holes 64A, 64B are located in the first and second valve mechanisms 24A, 24B, respectively. The ventilation holes are designed to act as a means of risk reduction. For instance, if the first piston o-ring 52A of the first valve mechanism 24A or the second piston o-ring 52B of the second valve mechanism 24B were to fail, the ventilation holes 64A, 64B would provide an escape route for the high pressure gas so as to allow valve mechanisms 24A, 24B to continue to function.

To aid in the assembly of the system, the first valve mechanism 24A is provided with a first snap ring 58A for securing the first fitting 34A to the first housing 26A at one end, and a fuel-inlet-fitting snap ring 60A for securing the fuel inlet fitting 45A to the first housing 26A at the other end of the first valve mechanism. Likewise the second valve mechanism 24B is provided with a second snap ring 58B for securing the second fitting 34B to the second housing 26B at one end, and a fuel-inlet-fitting snap ring 60B for securing the fuel inlet fitting 45B to the second housing 26B at the other end of the second valve mechanism 24B. The pilot valve assembly is easily assembled with the pilot valve 16 being screwably attached to the pilot valve housing.

The present invention has the capability to simultaneously control the flow of both the fuel and oxidizer through the use of pneumatics. This design can be used to control the flow of both liquid and gel propellants.

When an electrical signal is sent to the solenoid pilot valve 16, the result is that fuel and oxidizer are dispensed to the engine (e.g., a vortex rocket engine). When the pilot solenoid valve 16 is de-energized it moves into a closed position and the pressurized gas in the piston chambers (i.e, the gas in the channel regions 30A, 30B) flows out through solenoid vent channels (not shown) into the atmosphere. This causes the pistons 38A, 38B to become unpressurized and allows the return springs to bring the pistons back to their original position. Thus the connected poppets 36A, 36B move back into their closed position and cut off the flow of fuel and oxidizer.

Figure 4:
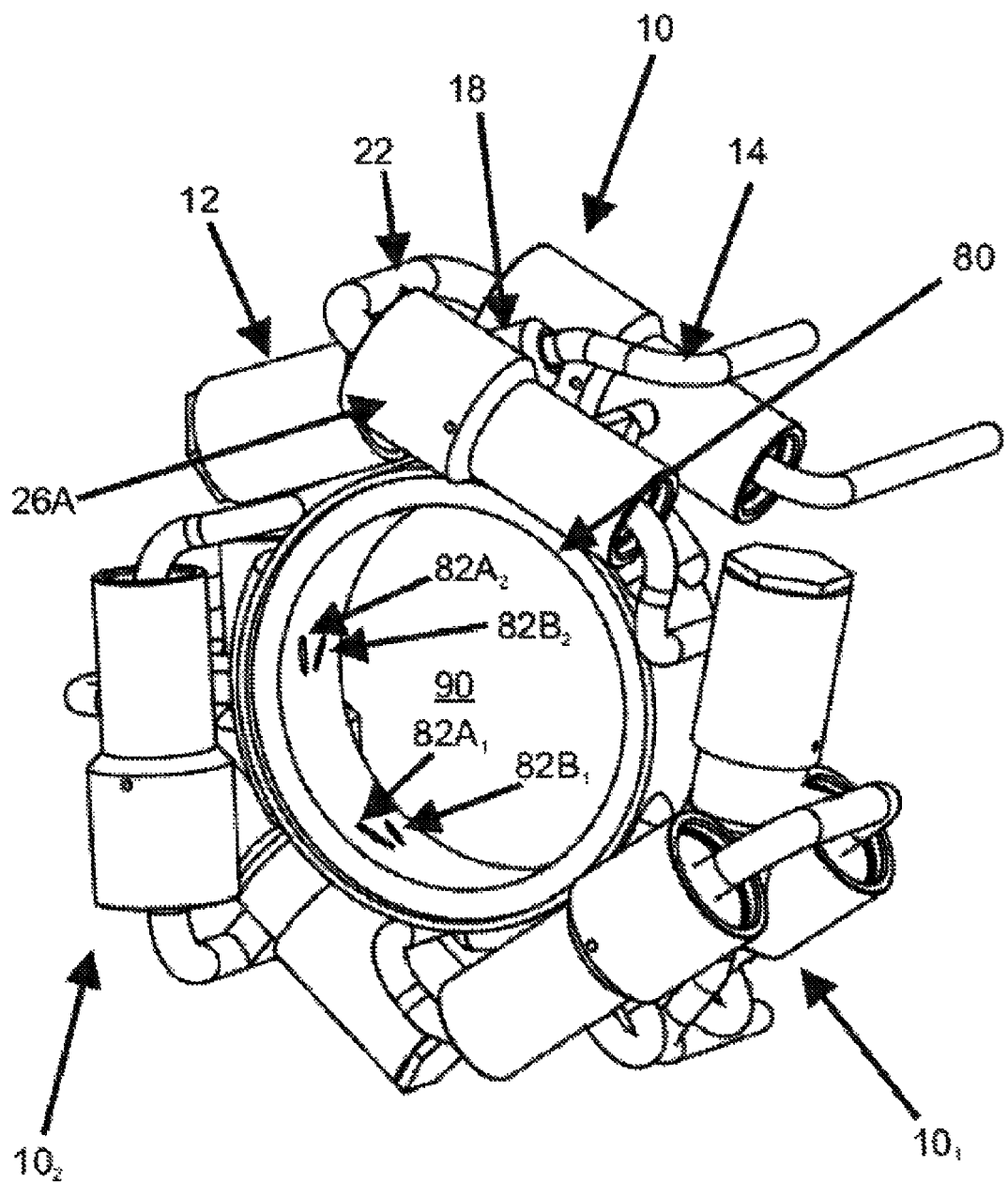
FIG. 4 is a perspective illustration demonstrating three PABV systems according to the present invention are mounted around the periphery of a vortex engine injector.
Figure 5:
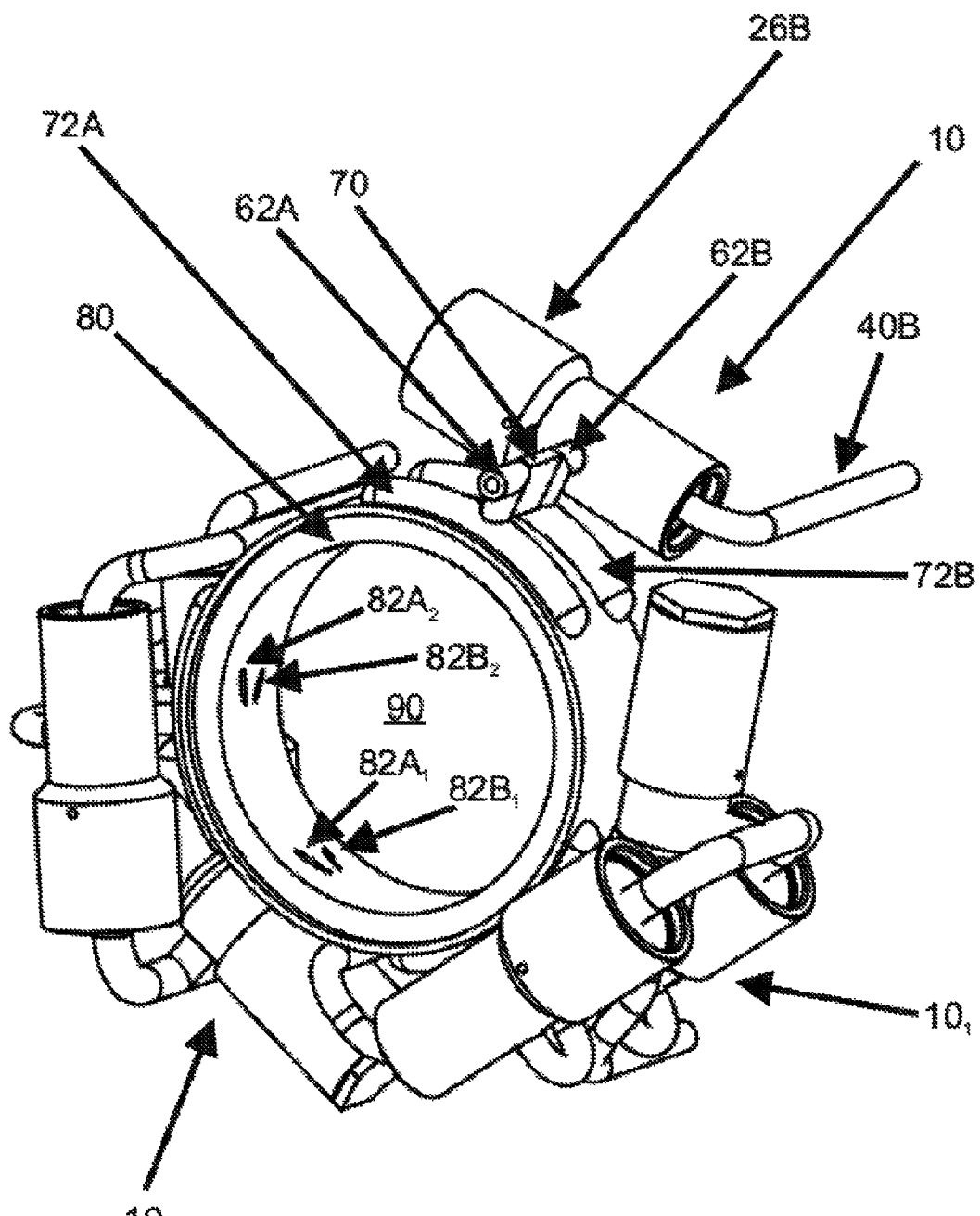
FIG. 5 is a perspective illustration demonstrating three PABV systems according to the present invention are mounted around the periphery of a vortex engine injector, as in FIG. 4; however in FIG. 5, the pilot valve assembly 12 and first housing 26A of PABV 10 have been removed for purposes of showing the mounted connections of the first outlet tube 62A and second outlet tube 62B to high pressure tubing welded to the vortex engine injector.

With reference to FIGS. 4-5, three PABV systems 10, 10₁, 10₂, are mounted around the outer periphery of a vortex engine injector 80. The mounting arrangement provides a separating distance from the vortex engine injector 80 and the PABV systems 10, 10₁, 10₂ for realizing more favorable heat transfer characteristics and preventing catastrophic failure.

In FIG. 5, the first outlet tube 62A and the second outlet tube 62B are welded to a mount support 70 with the first outlet tube 62A being connected to high pressure feed tubing 72A and the second outlet tube 62B being connected to high pressure feed tubing 72B. Feeding tubes 72A, 72B are mounted flush to the periphery of the vortex engine injector with the feeding tubes 72A, 72B. and the vortex engine injector being provided with passageways resulting in oxidizer being injected into the combustion chamber 90 through a plurality of oxidizer injector outlets 82B$_1$, 82B$_2$, etc. and fuel being injected into the combustion chamber 90 through a plurality of fuel injector outlets 82A$_1$, 82A$_2$ positioned on the interior surface of the vortex engine injector 80. PABV systems 10$_1$, 10$_2$ are mounted to the vortex engine injector 80 in the same manner as PABV system 10.

Various modifications are possible without deviating from the teachings and spirit of the present invention. Accordingly the scope of the invention is limited only by the claim language which follows hereafter.

What is claimed is:

1. A pneumatically actuated bi-propellant valve system (10), comprising:
   a pilot valve assembly (12) having a supply tube (14) directly connecting to a pilot valve (16) secured to a pilot valve housing (18);
   a bifurcated channel (22);
   a pneumatic gas conduit (20) connecting to said supply tube (14) and said pilot valve (16), said pneumatic gas conduit further being connected to said bifurcated channel (22);
   a first valve mechanism (24A) provided with a first housing (26A) which forms a first aft chamber region (28A), a first channel region (30A) and a first front chamber region (32A); said first aft chamber region (28A) being provided with a first fitting (34A) which connects to said bifurcated channel (22); said first channel region (30A) accommodating a first poppet (36A); a first piston (38A) located in said first aft chamber region (28A) makes direct contact with said first poppet (36A); an inlet fuel tube (40A) directly connecting to said first front chamber region (32A); a first biasing mechanism (42A) connected to said first piston and said first housing for impeding movement of said first piston toward the direction of said inlet fuel tube (38A); a fuel outlet (44A) directly connected to said first channel region;
   a second valve mechanism (24B) provided with a second housing (26B) which forms a second aft chamber region (28B), a second channel region (30B) and a second front chamber region (32B); said second aft chamber region (28B) being provided with a second fitting (34B) which connects to said bifurcated channel (22); said second channel region (30B) accommodating a second poppet (36B); a second piston (38B) located in said second aft chamber region (28B) makes direct contact with said second poppet (36B); an inlet oxidizer tube (40B) directly connecting to said second front chamber region (32A); a second biasing mechanism (42B) connected to said second piston (38B) and said second housing (26B) for impeding movement of said second piston in the direction of said inlet oxidizer tube (40B); an oxidizer outlet (44B) directly connected to said second channel region (30B); and
   wherein when said pilot valve (16) is open, pressurized gas flows from said supply tube (14) through conduit (20) and into said bifurcated channel (22) such that the pressurized gas exerts a sufficient force such that said first piston pushes said first poppet in the direction of said inlet fuel tube (40A) so as to allow fuel from said inlet fuel tube to pass through said first front chamber region (32A) into said first channel region (30A) and out said fuel outlet (44A); and
   when said pilot valve (16) is open, the pressurized gas flows from said supply tube (14) through conduit (20) and into said bifurcated channel (22) such that the pressurized gas exerts a sufficient force such that said second piston pushes said second poppet (36B) in the direction toward said inlet oxidizer tube (40B) so as to allow oxidizer from said oxidizer inlet tube (40B) to pass through said second front chamber region (32B) into said second channel region (30B) and out said oxidizer outlet (44B).

2. A pneumatically actuated bi-propellant valve system (10), according to claim 1, wherein: said pilot valve (16) is a solenoid pilot valve.

3. A pneumatically actuated bi-propellant valve system (10), according to claim 2, wherein:

said bifurcated channel (22) includes a first path (22A) which is connected to said first fitting (34A) and to said first aft chamber region (28A).

4. A pneumatically actuated bi-propellant valve system (10), according to claim 3, wherein:
said bifurcated channel (22) includes a second path (22B) which is connected to said second fitting (34B) and to said second aft chamber region (28B).

5. A pneumatically actuated bi-propellant valve system (10), according to claim 4, wherein:
a fuel inlet fitting (45A) is attached to said first housing (26A) and is positioned within the first front chamber region (32A), said inlet fuel tube (40A) being attached to said fuel inlet fitting (45A).

6. A pneumatically actuated bi-propellant valve system (10), according to claim 5, wherein:
an oxidizer inlet fitting (45A) is attached to said second housing (26B) and is positioned within the second front chamber region (32B), said inlet oxidizer tube (40B) being attached to said oxidizer inlet fitting (45A).

7. A pneumatically actuated bi-propellant valve system (10), according to claim 6, wherein
said first biasing mechanism (42A) is a spring.

8. A pneumatically actuated bi-propellant valve system (10), according to claim 7, wherein
said second biasing mechanism (42B) is a spring.

9. A pneumatically actuated bi-propellant valve system (10), according to claim 8, wherein
a first fitting o-ring (50A) contacts said first fitting (34A) and said first housing (26A).

10. A pneumatically actuated bi-propellant valve system (10), according to claim 9, wherein
a second fitting o-ring (50B) contacts said second fitting (34B) and said second housing (26B).

11. A pneumatically actuated bi-propellant valve system (10), according to claim 10, wherein a first piston o-ring (52A) contacts said first piston (38A) and said first housing (26A).

12. A pneumatically actuated bi-propellant valve system (10), according to claim 11, wherein a second piston o-ring (52B) contacts said second piston (38B) and said second housing (26B).

13. A pneumatically actuated bi-propellant valve system (10), according to claim 12, wherein
a first poppet o-ring (54A) contacts said first poppet (36A) and said first housing (26A).

14. A pneumatically actuated bi-propellant valve system (10), according to claim 13, wherein
a second poppet o-ring (54B) contacts said second poppet (36B) and said second housing (26B).

15. A pneumatically actuated bi-propellant valve system (10), according to claim 14, wherein:
a first boundary wall (46A) is formed in said first housing (26A), said first boundary wall marking an interface between said first channel region (30A) and said first front chamber region (32A), when the pilot valve (16) is closed said first poppet (36A) moves in the direction toward said first fitting (34A) and prevents fuel flow from said first front chamber region (32A) to said first channel region (30A).

16. A pneumatically actuated bi-propellant valve system (10), according to claim 15, wherein:
a second boundary wall (46B) is formed in said second housing (26B), said second boundary wall marking an interface between said second channel region (30B) and said second front chamber region (32B), and when the pilot valve (16) is closed said second poppet (36B) moves in the direction toward said second fitting (34B) and prevents fuel flow from said second front chamber region (32B) to said first channel region (30B).

17. A pneumatically actuated bi-propellant valve system (10), according to claim 16, wherein:
said first poppet (36A) is provided with a first poppet seat (48A) for making contact with said first boundary wall (46A) and said second poppet (36B) is provided with a second poppet seat (48B) for making contact with said second boundary wall (46B).

18. A pneumatically actuated bi-propellant valve system (10), according to claim 17, wherein:
said first valve mechanism (24A) is provided with a first snap ring (58A) for securing said first fitting (34A) to said first housing (26A) and said first valve mechanism (24A) is further provided with a fuel-inlet-fitting snap ring (60A) for securing said fuel inlet fitting (45A) to said first housing.

19. A pneumatically actuated bi-propellant valve system (10), according to claim 18, wherein:
said second valve mechanism (24B) is provided with a second snap ring (58B) for securing said second fitting (34B) to said second housing (26B), and said second valve mechanism (24B) is further provided with a fuel-inlet-fitting snap ring (60B) for securing said fuel inlet fitting (45A) to said first housing.

20. A pneumatically actuated bi-propellant valve system (10), according to claim 19, wherein:
said pressurized gas is nitrogen gas.

* * * * *